US011864077B2

(12) United States Patent
Ramamoorthy et al.

(10) Patent No.: US 11,864,077 B2
(45) Date of Patent: Jan. 2, 2024

(54) MEDIA STREAM HANDOVER USING WIRELESS CONNECTED DEVICES

(71) Applicant: Cisco Technology, Inc., San Jose, CA (US)

(72) Inventors: Prapanch Ramamoorthy, Bangalore (IN); David John Zacks, Vancouver (CA)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/696,322

(22) Filed: Mar. 16, 2022

(65) Prior Publication Data

US 2023/0300582 A1    Sep. 21, 2023

(51) Int. Cl.
*H04W 4/80*    (2018.01)
*H04W 24/02*    (2009.01)
*H04R 29/00*    (2006.01)
*H04B 17/318*    (2015.01)

(52) U.S. Cl.
CPC ............ *H04W 4/80* (2018.02); *H04B 17/318* (2015.01); *H04R 29/001* (2013.01); *H04W 24/02* (2013.01); *H04R 2420/07* (2013.01)

(58) Field of Classification Search
CPC ....... H04W 4/80; H04W 24/02; H04B 17/318
See application file for complete search history.

(56) References Cited

U.S. PATENT DOCUMENTS

| 8,028,082 | B2 * | 9/2011 | Hooda | H04L 67/52 |
| | | | | 709/227 |
| 10,298,628 | B2 * | 5/2019 | Stahl | H04L 65/1069 |
| 10,992,814 | B1 | 4/2021 | Mccann et al. | |
| 2009/0285175 | A1 * | 11/2009 | Nix | H04L 65/1094 |
| | | | | 370/331 |
| 2014/0308939 | A1 | 10/2014 | Goldman et al. | |
| 2014/0359709 | A1 | 12/2014 | Nassar et al. | |
| 2016/0142865 | A1 | 5/2016 | Park et al. | |
| 2016/0165184 | A1 | 6/2016 | Aaron et al. | |

(Continued)

OTHER PUBLICATIONS

Nicole Herskowitz et al., "New Microsoft Teams Phone features give calling a modem makeover", Microsoft, Sep. 27, 2021, 7 pages.

(Continued)

*Primary Examiner* — David Bilodeau
(74) *Attorney, Agent, or Firm* — Edell, Shapiro & Finnan, LLC

(57) ABSTRACT

A first connection is established between a meeting server and a first endpoint device associated with a user. At least one multimedia stream for an online collaborative session is provided from the meeting server to the first endpoint device. The meeting server obtains an indication that a first strength of a first short-range wireless communication connection between an audio device and the first endpoint device is less than a second strength of a second short-range wireless communication connection between the audio device and a second endpoint device associated with the user. A second connection is established between the meeting server and the second endpoint device. The at least one multimedia stream is provided from the meeting server to the second endpoint device via the second connection in response to obtaining the indication.

20 Claims, 12 Drawing Sheets

(56) References Cited

U.S. PATENT DOCUMENTS

2021/0126912 A1* 4/2021 Maclean .............. H04W 12/63
2022/0303331 A1* 9/2022 Svennebring ...... H04N 21/8456

OTHER PUBLICATIONS

Zoom, "Transferring meetings between devices", last updated Dec. 15, 2021, retrieved from Internet Mar. 16, 2022, 2 pages; https://support.zoom.us/hc/en-us/articles/4405850501133-Transferring-meetings-and-webinars-between-devices.

SteelSeries, "Arctis Pro Peerless High Resolution PC Gaming Headset", retrieved from Internet Mar. 16, 2022, 18 pages; https://steelseries.com/gaming-headsets/arctis-pro.

\* cited by examiner

MEDIA STREAM HANDOVER USING WIRELESS CONNECTED DEVICES

TECHNICAL FIELD

The present disclosure relates to online collaborative sessions, such as online video conferences.

BACKGROUND

Currently, remote work is on the rise, and it is expected that remote work will continue to expand for the foreseeable future. With a growing need to stay in touch with and manage distributed workforces, organizations have greatly increased their use of online collaboration technologies, including the use of video conferencing solutions.

Remote workers in online video conferences are generally limited in their ability to move around even when connected to audio streams through a wireless connected headset, such as a Bluetooth® wireless headset. For example, connectively for such wireless devices are often limited by the range that the wireless radio supports, which for Bluetooth is often limited to around 10 meters based on the obstacles between the transmitter and the receiver.

DESCRIPTION OF EXAMPLE EMBODIMENTS

Overview

Briefly, presented herein are techniques for transitioning the providing of online collaborative session multimedia streams from a first endpoint device to a second endpoint device based upon the signal strength of a connection between the first endpoint device and a wireless device, such as wireless headset or other wireless audio device. A first connection is established between a meeting server and a first endpoint device associated with a user. At least one multimedia stream for an online collaborative session is provided from the meeting server to the first endpoint device. The meeting server obtains an indication that a first strength of a first short-range wireless communication connection between an audio device and the first endpoint device is less than a second strength of a second short-range wireless communication connection between the audio device and a second endpoint device associated with the user. A second connection is established between the meeting server and the second endpoint device. The at least one multimedia stream is provided from the meeting server to the second endpoint device via the second connection in response to obtaining the indication.

Example Embodiments

Figure 1A:
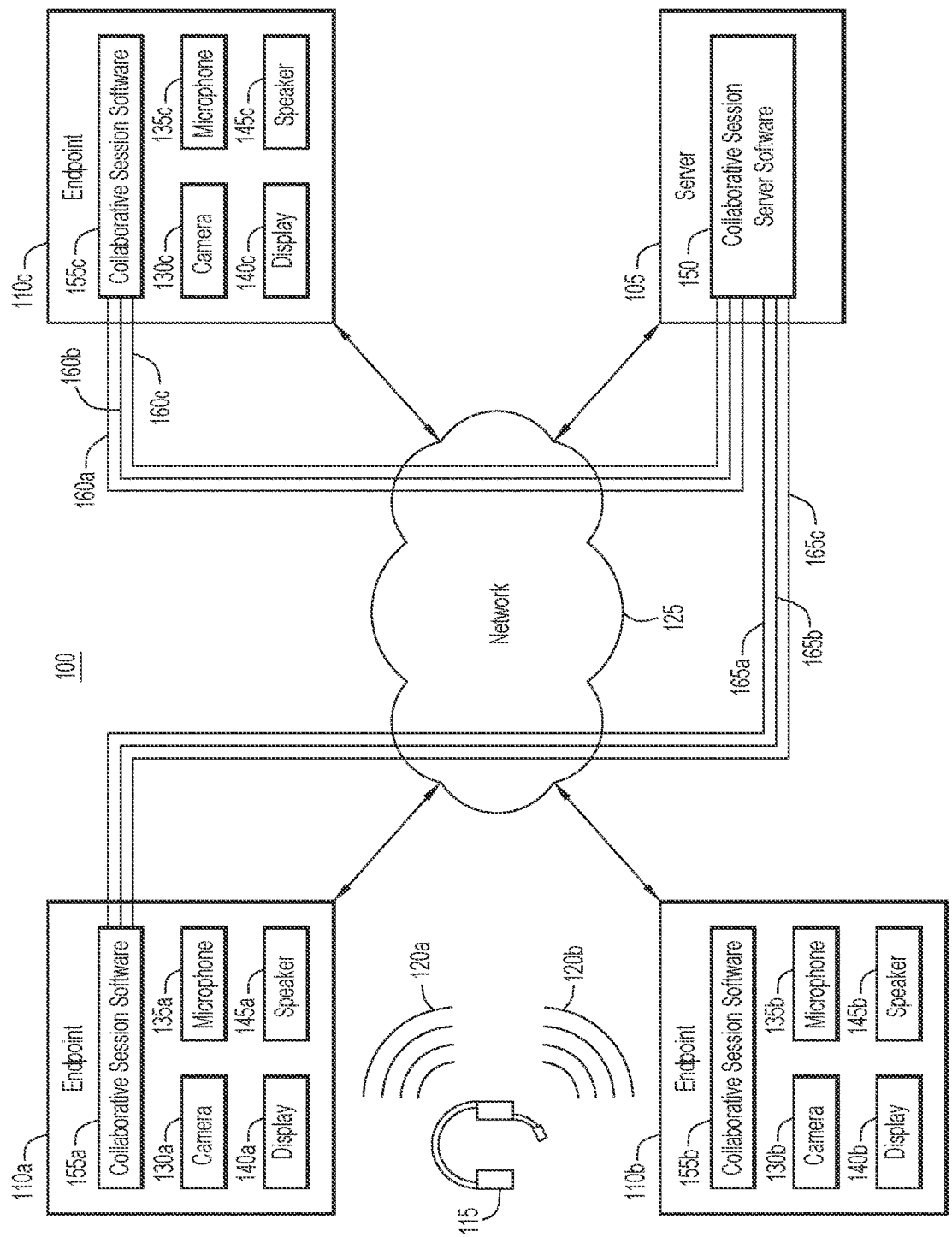
FIGS. 1A-1C are functional block diagrams of an online collaborative session system configured to implement media stream handover techniques, according to an example embodiment.
Figure 1B:
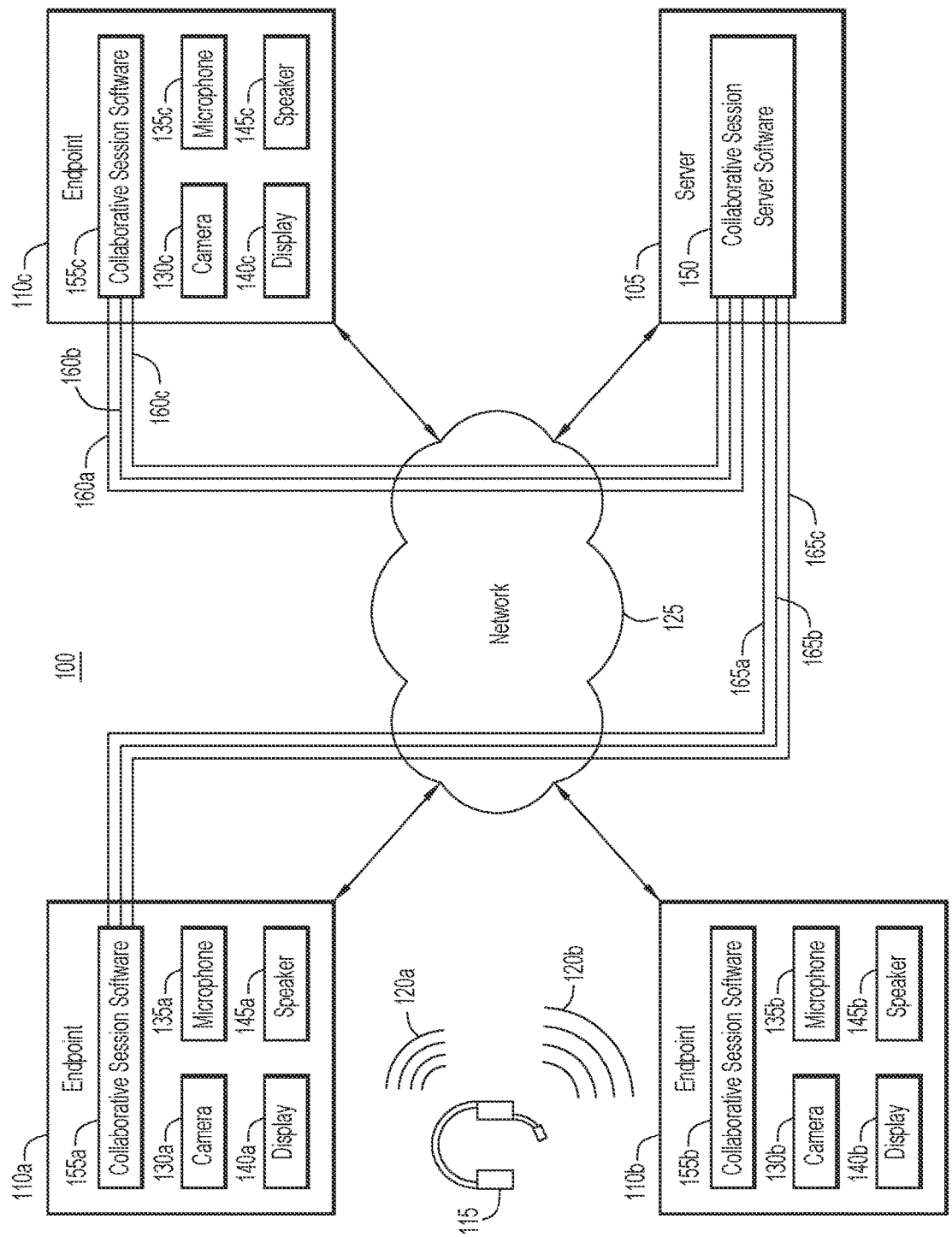
Figure 1C:
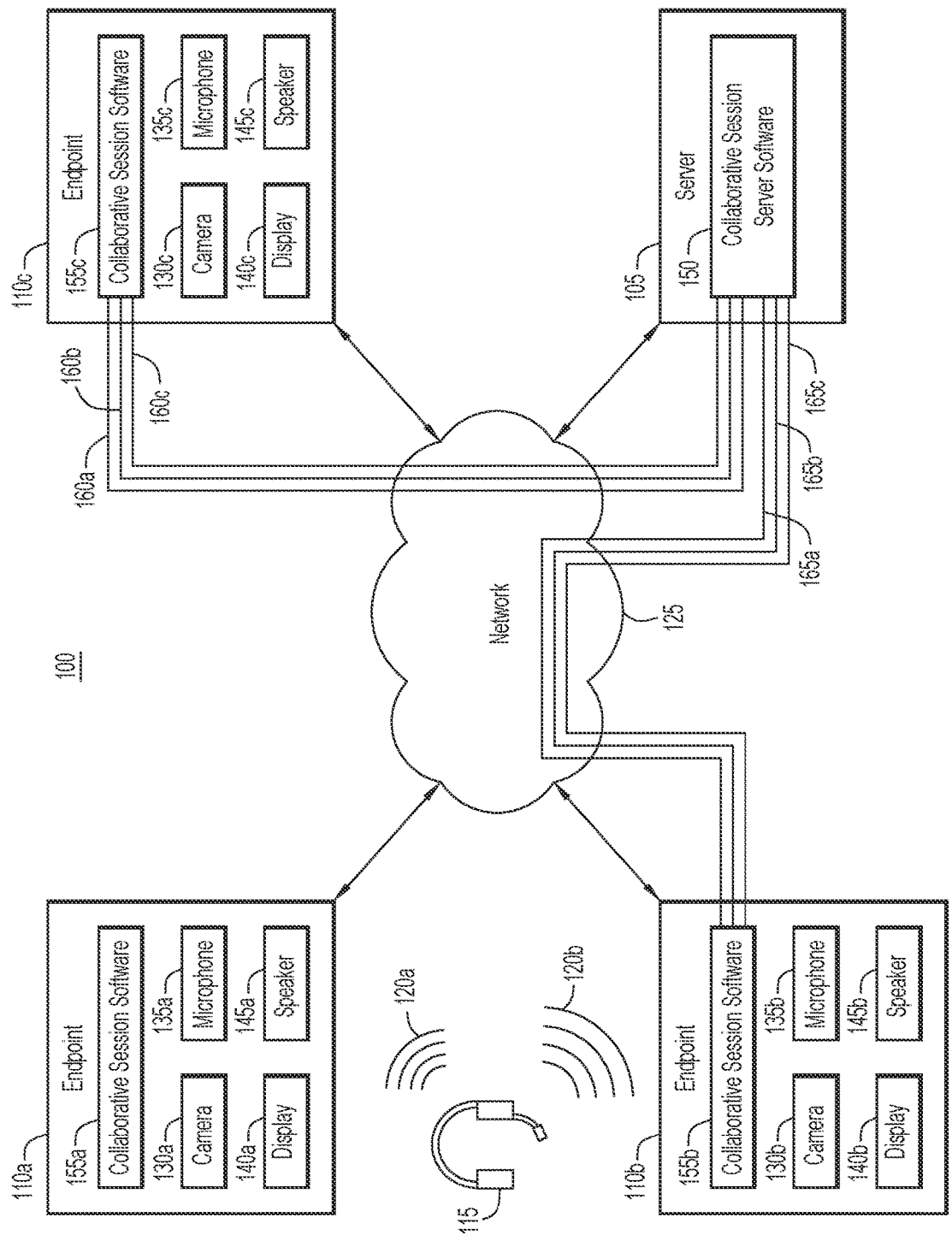

With reference first made to FIGS. 1A-1C, shown is an example system 100 configured to implement techniques for transitioning the providing of online collaborative session multimedia streams from a first endpoint device to a second endpoint device based upon the signal strength of a connection between the first endpoint device and a wireless device, such as wireless headset or other wireless audio device. System 100 includes server 105, endpoint devices 110*a-c*, and audio device 115. Endpoint device 110*a* may be a suitable fixed device (e.g., a desktop computing device, a laptop computing device connected to external input/output devices, a video conference endpoint device, etc.) while endpoint device 110*b* may be a suitable mobile device (e.g., smartphone, laptop, tablet, etc.), both of which are capable of communicating over network 125. Network 125 may be any suitable network to enable various components of system 100 to communicate with each other, such as the Internet.

Endpoint devices 110*a-c* may enable respective participants to participate in an online collaborative session (e.g., a video teleconference). To that end, endpoint devices 110*a*-110*c* respectively include cameras 130*a*-130*c*, microphones 135*a*-135*c*, displays 140*a*-140*c*, speakers 145*a*-145*c*, and collaborative session software 155*a*-155*c*.

In one example, server 105 may facilitate, via collaborative session server software 150, the distribution of a plurality of media streams 160a-160c (e.g., audio streams, video streams, application data streams, chat data streams, screen sharing data streams, etc.) sent via endpoint device 110c to endpoint device 110a as media streams 165a-165c. For example, camera 130c may capture video, which collaborative session software 155c transmits to server 105 as media steam 160a. Collaborative session server software 150 then distributes the video to endpoint device 110a as media stream 165a. The video may then be displayed on display 140a. Similarly, microphone 135c may capture audio (e.g., audio of the user associated with endpoint device 110c), which collaborative session software 155c transmits to server 105 as media steam 160b. Collaborative session server software 150 then distributes the audio to endpoint device 110a as media stream 165b. The audio may then be replayed via speaker 145a. Similarly, collaborative session software 155c may capture application data executing on endpoint device 110c, such as a shared document, and transmit this data to server 105 as data stream 160c. Collaborative session server software 150 then distributes the application data to endpoint device 110a as media stream 165c. The application data may then be displayed by collaborative session software 155a on display 140a.

Also included in system 100 is an audio device 115 that is configured to replay the audio received at one or more of endpoint devices 110a and 110b via short-range wireless communication connections 120a and 120b. For example, audio device 115 may be embodied as a personal speaker or personal audio device, such as a headset, earphones, an ear piece, or another audio device that may or may not include a microphone, that connects to endpoint devices 110a and 110b using a short-range wireless technology to form short-range wireless communication connections 120a and 120b. Short-range wireless technologies include Bluetooth®, Infrared Data Association (IrDA), Wi-Fi®/Wi-Fi6®, Near-Field Communication (NFC), Ultra-Wideband (UWB), Personal Area Network (PAN), Institute of Electrical and Electronics Engineers (IEEE) 802.15.4, and other technologies known to the skilled artisan. Audio device 115 connects to both of endpoint devices 110a and 110b using a Bluetooth wireless connection in the specific embodiment of FIGS. 1A-C, while other embodiments may utilize other short-range wireless technologies to form short-range wireless communication connections 120a and 120b.

According to the techniques presented herein, both of endpoint devices 110a and 110b are associated with the same user. Furthermore, server 105 is configured to redirect multimedia data streams 165a-c from endpoint device 110a to endpoint device 110b depending on the relative strengths of short-range wireless communication connections 120a and 120b.

For example, endpoint device 110a may be embodied as a fixed endpoint device, such as a personal computer, and endpoint device 110b may be embodied as a mobile endpoint device, such as a smartphone or tablet computing device, both of which are associated with the same user. This user utilizes audio device 115, embodied as a Bluetooth headset, to consume the audio media stream 165b sent to endpoint device 110a from server 105. One or more of the illustrated devices (i.e., endpoint device 110a, endpoint device 110b, and/or server 105) may be configured to monitor the strength of Bluetooth connections 120a and 120b.

As illustrated in FIG. 1B, if the user gets up to move around, the signal strength of connection 120a to endpoint device 110a may decrease, while the signal strength of connection 120b to endpoint device 110b remains high. Such values for the strengths of connections 120a and 120b may represent a case where the user has moved and taken their smartphone (i.e., mobile endpoint device 110b) with them, and left their fixed endpoint device (i.e., endpoint device 110a) behind. A real world example of such a situation may be a user getting up from their desk in the middle of a video conference to get a new cup of coffee from another room.

In such a case, the techniques of the present disclosure may automatically trigger a handover/fallback of the meeting connection from endpoint device 110a to endpoint device 110b, as illustrated in FIG. 1C. As shown in FIG. 1C, media streams 165a-c, which were previously provided from server 105 to endpoint device 110a, are now provided from server 105 to endpoint device 110b. In order to implement this handover/fallback, endpoint devices 110a and 110b and server 105 may exchange messages that result in the media streams 165a-c transitioning from being provided to endpoint device 110a (as illustrated in FIGS. 1A and 1B) to be being provided to endpoint device 110b (as illustrated in FIG. 1C).

For simplicity of description, the techniques presented herein have been described with respect to media streams that have been provided to endpoint devices 110a and 110b by server 105. The skilled artisan will understand that the techniques presented herein also apply to media streams provided from endpoint devices 110a and 110b to server 105 for distribution as part of the online collaborative session. Accordingly, media streams 160a-c and 165a-c may be understood to be bidirectional media streams.

The handover/fallback may be implemented in a "make-before-break" fashion. For example, there may be an intermediate state/phase between FIGS. 1B and 1C in which media streams 165a-c are provided to both endpoint device 110a and endpoint device 110b. In other words, all of the multimedia streams associated with the online collaborative session are provided to endpoint device 110b before the multimedia streams is no longer provided to endpoint device 110a. Collaborative session software 155a and collaborative session software 155b may be configured to implement such an intermediate state (i.e., a state in which streams 165a-c are provided to both of endpoint device 110a and endpoint device 110b) in such a way that avoids disruption of the online collaborative session. For example, collaborative session software 155b on endpoint device 110b may mute microphone 135b until the handover is complete (i.e., until media streams 165a-c are no longer provided to endpoint device 110a) to avoid audio feedback. Similarly, camera 130b may be disabled until after the handover is complete. Once the media streams 165a-c are determined as being successfully provided to endpoint device 110b, server 105 may discontinue providing the streams to endpoint device 110a, and collaborative session software 155b of endpoint device 110b may enable microphone 135b and/or camera 130b.

By implementing the techniques presented herein, a user simply has to have their mobile device with them when they are moving about, the transitioning of the online collaborative session streams from the fixed endpoint device to the mobile endpoint device may be implemented automatically and transparently. For example, messages exchanged between endpoint devices 110a and 110b and server 105 may auto-launch or otherwise fully enable collaborative session software 155b on endpoint device 110b, and media streams 165a-c may be provided to endpoint device 110b at the appropriate time without user intervention. Accordingly, the user is no longer restricted to the area within the transmission range between audio device 115 and endpoint device 110a during a meeting. Instead, the user can move much longer distances with ease and simplicity, as the media streams 165a-c will transition from fixed endpoint device 110a to mobile endpoint device 110b as the user moves out of the transmission range between audio device 115 and endpoint device 110a.

Furthermore, when the user comes back within range of fixed endpoint device 110a, the online collaborative session may transition back from mobile endpoint device 110b to fixed endpoint device 110a. For example, the user experience of the online collaborative session may be improved when experienced through fixed endpoint device 110a as fixed endpoint device 110a may be configured with a larger display 140a and include better user input devices, such as a physical keyboard. Accordingly, a user may set a level of priority for each of its associated endpoint devices. Such priorities may be set through collaborative session software 155a or 155b. Therefore, if fixed endpoint device 110a has a higher priority than mobile endpoint device 110b, when the signal strength for connection 120a increases sufficiently, such as above a predetermined threshold, the online collaborative session may transition from mobile endpoint device 110b back to fixed endpoint device 110a. The transition back to endpoint device 110a may be implemented in the same transparent and seamless manner as the transition from fixed endpoint device 110a to mobile endpoint device 110b. Accordingly, when the user is back at their preferred work location, they can resume working on their preferred choice of endpoint device without having to manually intervene through collaborative session software 155a or 155b.

In summary, the techniques may implement the following process:
1) Signal strength monitoring of the wireless radio between the headset and endpoint device will be done on both the mobile and fixed endpoint device.
2) If the signal strength falls below a certain threshold "X" for the fix endpoint device, a transition from the fixed endpoint device to a mobile endpoint device is implemented, so long as the signal strength to the mobile endpoint device is greater than the signal strength to the fixed endpoint device. This transition may be implemented in a number of ways. According to one example, a notification is sent to the meeting server indicating that the signal strength between the headset and the fixed endpoint device has fallen below the threshold "X." The meeting server relays this information to other endpoint devices via which the user is logged into the meeting application. If there is no other endpoint device associated with the user that is paired with the same headset and that also has a higher signal strength, then no action is taken. If an endpoint device that receives this relayed message detects that it has a higher signal strength than the other endpoint device, a handover to that endpoint device is triggered. This is just one example of how this handover may be carried out. Other examples are described below with reference to FIGS. 3-6.
3) If a handover is triggered, the meeting server ensures the audio connection to the mobile endpoint device is established before the fixed endpoint device is disconnected. In other words, the transition is made in a "make-before-break" fashion.
4) The monitoring of the signal strength for the endpoint devices may continue because, for example, the user's preference may be that the fixed endpoint device should have priority over mobile endpoint devices. When the fixed endpoint device detects the signal strength is back above a certain threshold "Y," an indication is provided to the meeting server. The threshold "Y" may be sufficiently higher than the threshold "X" to ensure there is no possible race condition if the signal strength is unstable for some reason.
5) Upon receiving this notification, the meeting server triggers a handback from the mobile endpoint device to the fixed endpoint device.

Figure 2:
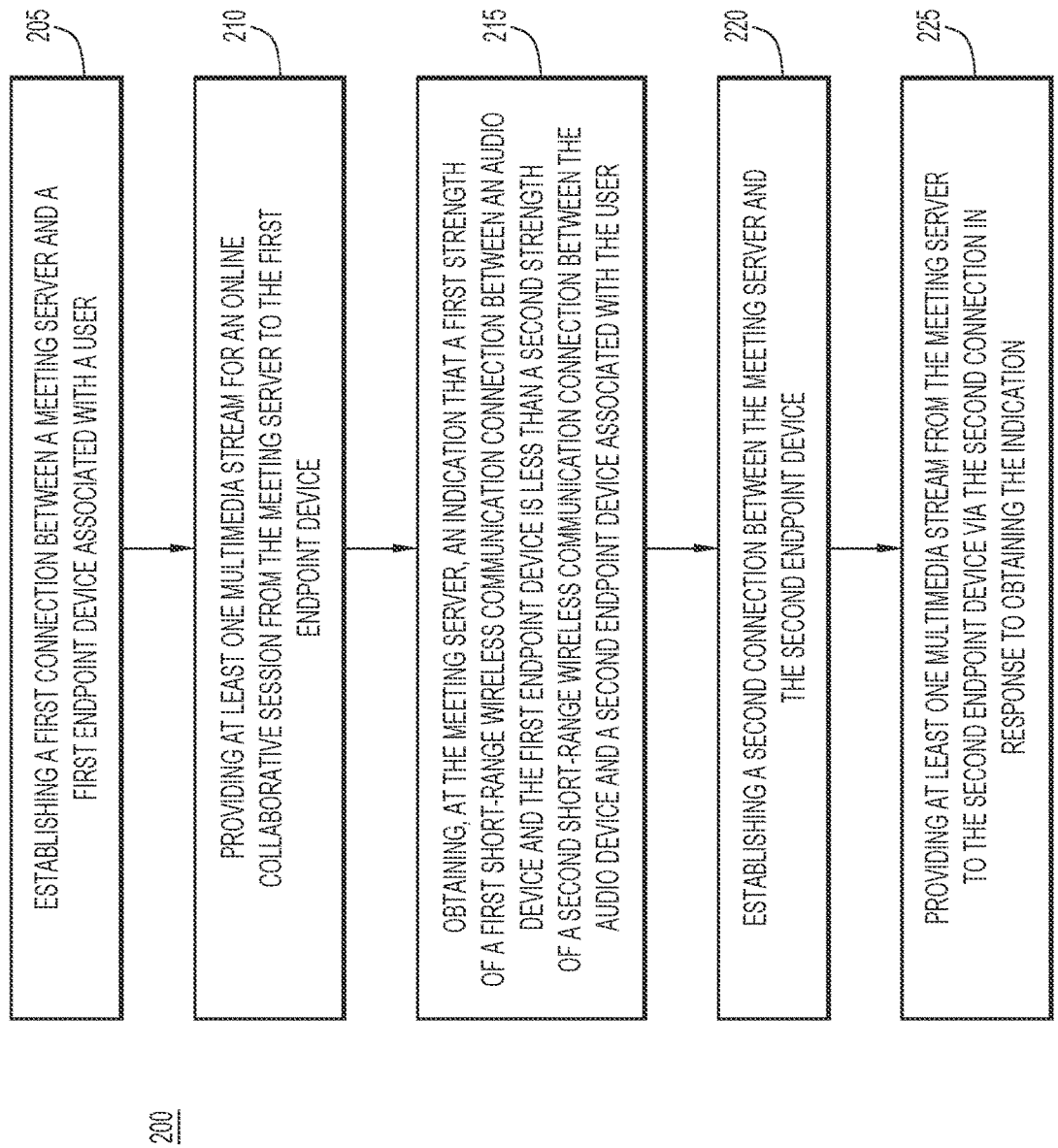
FIG. 2 is a flowchart illustrating a process flow for implementing media stream handover techniques, according to an example embodiment.

With reference now made to FIG. 2, depicted therein is a flowchart 200 illustrating a process flow for implementing these techniques. The process flow begin in operation 205 in which a first connection is established between a meeting server and a first endpoint device associated with a user. For example, this first connection may be a connection between endpoint device 110a and server 105 of FIGS. 1A-1C.

In operation 210, at least one multimedia stream for an online collaborative session is provided to the first endpoint device from the meeting server. For example, operation 210 may be embodied as media streams 165a-c being provided to endpoint device 110a, as illustrated in FIGS. 1A and 1B.

In operation 215, an indication is obtained at the meeting server that indicates that a first strength of a first short-range wireless communication connection between an audio device and the first endpoint device is less than a second strength of a second short-range wireless communication connection between the audio device and a second endpoint device associated with the user. For example, operation 215 may be embodied as server 105 receiving an indication that the signal strength for connection 120a is weaker than the signal strength for connection 120b, as illustrated FIG. 1B. Specific example embodiments of operation 215 will be described with reference to FIGS. 3-6 below.

Next, in operation 220, a second connection is established between the meeting server and the second endpoint device. Finally, in operation 225, the at least one multimedia stream is provided by the meeting server to the second endpoint device via the second connection in response to obtaining the indication. For example, operation 225 may be embodied as server 105 providing media streams 165a-c to endpoint device 110b, as illustrated in FIG. 1C.

In FIG. 2, operation 220 is shown taking place after operations 205, 210 and 215. Though, in other embodiments, establishing the connection between the second endpoint device and the meeting server may take place prior to one or more of operations 205, 210 and 215. For example, a connection may be established between the second endpoint device and the meeting server when the user first joins an online collaborative session. Accordingly, operation 220 may take place concurrently with operation 205 and prior to operations 210 and 215. On the other hand, the connection between the meeting server and the second meeting endpoint device may be established only after the indication of operation 215 is received by the meeting server. Accordingly, operation 220 may take in the relative order illustrated in FIG. 2.

Flowchart 200 is directed to a process flow in which media streams provided to the endpoint devices associated with the user are handed over from a first endpoint device to a second endpoint device. The skilled artisan will understand that the techniques presented herein also apply to media streams provided from the endpoint devices to the server. Accordingly, the techniques presented herein also provide for a process flow that includes the operations of: establishing a first connection between a meeting server and a first endpoint device associated with a user; obtaining at least one multimedia stream for an online collaborative session at the meeting server from the first endpoint device; obtaining, at the meeting server, an indication that a first strength of a first short-range wireless communication connection between an audio device and the first endpoint device is less than a second strength of a second short-range wireless communication connection between the audio device and a second endpoint device associated with the user; establishing a second connection between the meeting server and the second endpoint device; and obtaining the at least one multimedia stream at the meeting server from the second endpoint device via the second connection in response to obtaining the indication.

Figure 3:
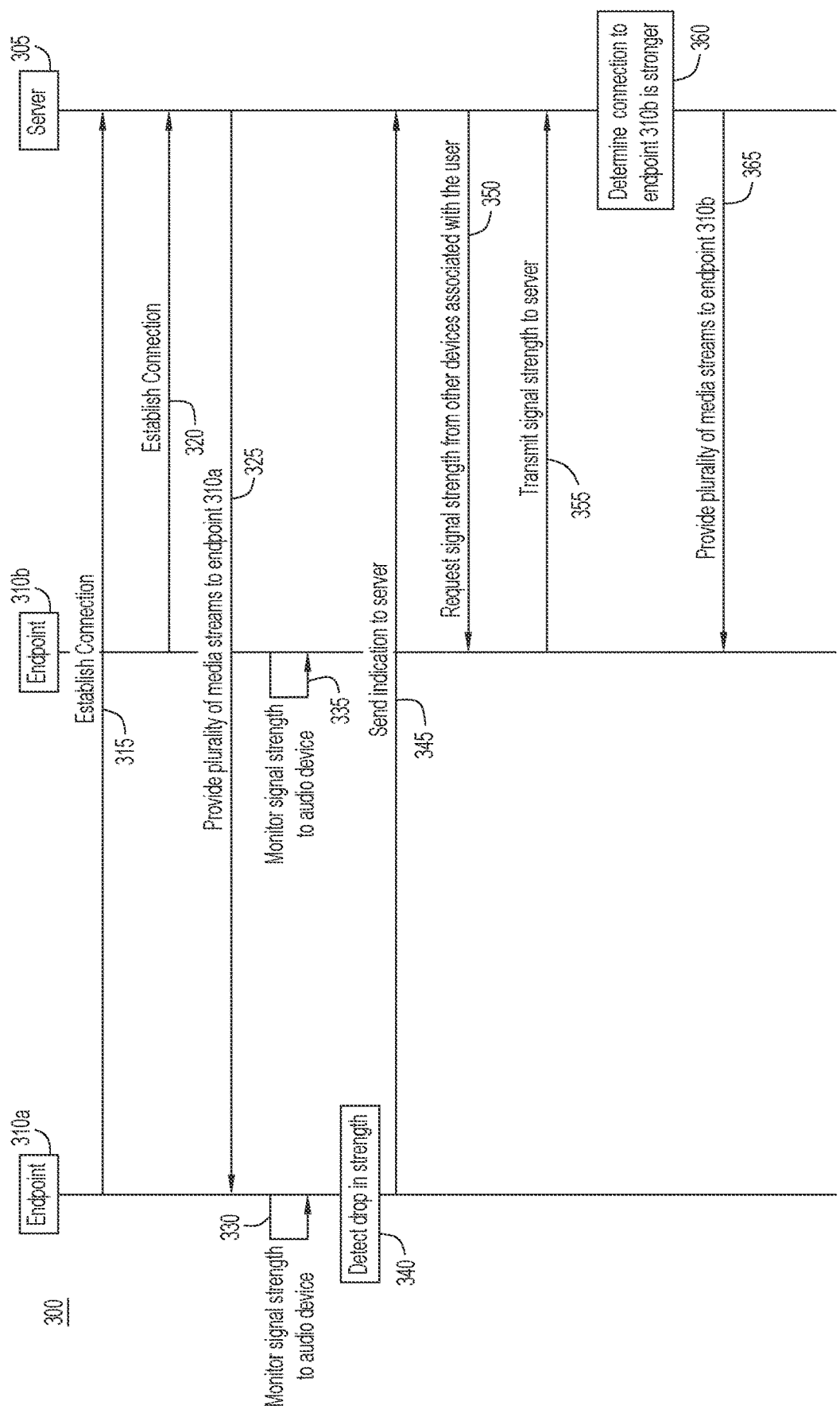
FIG. 3 is a first call flow diagram illustrating a sequence of messages and operations carried out in an online collaborative session system to handover multimedia streams from a first endpoint device to a second endpoint device based upon their respective signal strengths to a wireless device, according to an example embodiment.

With reference now made to FIG. 3, depicted therein is a call flow diagram 300 illustrating an embodiment of these techniques. Shown in call flow diagram 300 are operations carried out between an endpoint device 310a, an endpoint device 310b and a server 305. Endpoint device 310a, endpoint device 310b and server 305 are analogous to the devices 110a, 110b and 105, respectively, as illustrated in FIGS. 1A-1C. Accordingly, endpoint device 310a may be embodied as a fixed endpoint device, endpoint device 310b may be embodied as a mobile endpoint device, and server 305 may be embodied as a meeting server of an online collaborative session system.

As noted above, call flow diagram 300 illustrates a first example of operation 215 of FIG. 2, that is, the operation of obtaining at the meeting server an indication that the strength of the first short-range wireless communication connection between the audio device and the first endpoint device is less than the strength of the second short-range wireless communication connection between the audio device and the second endpoint device associated with the user. Specifically, as explained in detail below, operations 345-355 provide a first example embodiment of operation 215 of FIG. 2.

Call flow diagram 300 begins with operations 315, 320 and 325. In operation 315, a connection is established between endpoint device 310a and the server 305. In operation 320, a connection is established between endpoint device 310b and server 305. The establishment of the connections indicated in operations 315 and 320 may include providing server 305 with indications that endpoint device 310a and endpoint device 310b have both connected to the same audio device via respective short-range wireless communication connections. In operation 325, server 305 provides one or more media streams to endpoint device 310a. Accordingly, operation 325 may be embodied as server 105 of FIGS. 1A and 1B providing media streams 165a-c to endpoint device 110a. Operation 325 may also include the obtaining of multimedia streams from endpoint device 310a by server 305.

In operation 330, endpoint device 310a monitors the signal strength of the short-range wireless communication connection between itself and the audio device. Similarly, in operation 335, endpoint device 310b monitors the signal strength of the short-range wireless communication connection between itself and the audio device.

In operation 340, endpoint device 310a detects a drop in the signal strength being monitored in operation 330. In response to the detection in operation 340, endpoint device 310a sends message 345 to server 305 that indicates the drop in signal strength. Message 345 may include an identifier for the audio device, such as a Bluetooth address (sometimes referred to as a Bluetooth media access control (MAC) address) so that server 305 is made aware of to which device the signal strength applies. In response to receiving message 345, server 305 sends request message 350 to other endpoint devices associated with the user. Message 345 requests the signal strength between the endpoint device receiving the message and the audio device. Request message 350 may also include the audio device identifier so that only endpoint devices with connections to that audio device respond to the request of message 350.

According to the example of FIG. 3, the only other endpoint device associated with the user is endpoint device 310b. Endpoint device 310b responds with message 355, which indicates the strength of the short-range wireless communication connection between itself and the audio device. Based upon the content of messages 345 and 355, server 305 determines in operation 360 that the short-range wireless communication connection between endpoint device 310b and the audio device is stronger than the short-range wireless communication connection between endpoint device 310a and the audio device. Accordingly, server 305 provides the one or more media streams to endpoint device 310b in operation 365. Operation 365 may also include the obtaining of multimedia streams from endpoint device 310b by server 305.

As discussed above, the indication to server 305 that the strength of the short-range wireless communication connection between endpoint device 310b and the audio device is greater than that of the short-range wireless communication connection between endpoint device 310a and the audio device is in response to a plurality of messages, mainly messages 345 and 355. Accordingly, the indication recited in operation 215 of FIG. 2 may be embodied as a plurality of messages sent from endpoint device 310a and endpoint device 310b.

Figure 4:
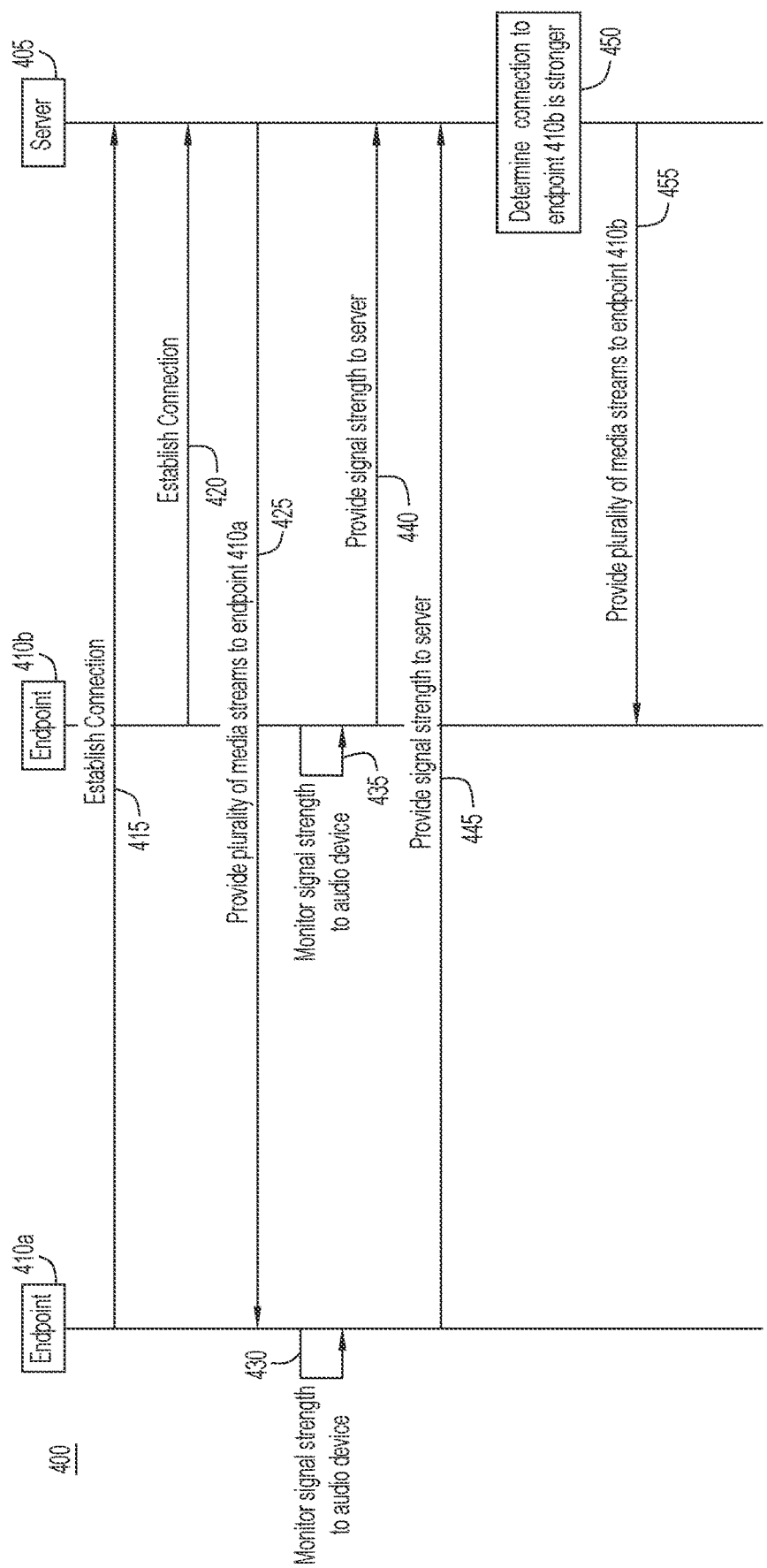
FIG. 4 is a second call flow diagram illustrating a sequence of messages and operations carried out in an online collaborative session system to handover multimedia streams from a first endpoint device to a second endpoint device based upon their respective signal strengths to a wireless device, according to an example embodiment.

With reference now made to FIG. 4, depicted therein is a second call flow diagram 400 illustrating another embodiment of the techniques. As with endpoint devices 310a and 310b and server 305 of FIG. 3, endpoint device 410a may be embodied as a fixed endpoint device, endpoint device 410b may be embodied as a mobile endpoint device, and server 405 may be embodied as a meeting server of an online collaborative session system, analogous to devices 110a, 110b and 105, respectively, of FIGS. 1A-1C.

Call flow diagram 400 illustrates a second example of operation 215 of FIG. 2—i.e., the operation of obtaining at the meeting server an indication that the strength of the first short-range wireless communication connection between the audio device and the first endpoint device is less than the strength of the second short-range wireless communication connection between the audio device and the second endpoint device associated with the user. As explained in detail below, operations 440-450 provide a second example embodiment of operation 215 of FIG. 2.

Call flow diagram 400 begins with operations 415, 420 and 425, which are analogous to operations 315, 320 and 325 of FIG. 3. In operation 415, a connection is established between endpoint device 410a and server 405. In operation 420, a connection is established between endpoint device 410b and server 405. The establishment of the connections indicated in operations 415 and 420 may include providing server 405 with indications that endpoint device 410a and endpoint device 410b have both connected to the same audio device via respective short-range wireless communication connections. In operation 425, server 405 provides one or more media streams to endpoint device 410a. Accordingly, operation 425 may be embodied as server 105 of FIGS. 1A and 1B providing media streams 165a-c to endpoint device 110a. Operation 425 may also include the obtaining of multimedia streams from endpoint device 410a by server 405.

Also similar to the operations illustrated in FIG. 3, in operation 430, endpoint device 410a monitors the signal strength of the short-range wireless communication connection between itself and the audio device. Similarly, in operation 435, endpoint device 410b monitors the signal strength of the short-range wireless communication connection between itself and the audio device. It is here that call flow diagram 400 diverges from that of call flow diagram 300 of FIG. 3.

Call flow diagram 400 includes message 440 provided from endpoint device 410b to server 405. Message 440 indicates to server 405 the current strength of the short-range wireless communication connection between endpoint device 410b and the audio device. Furthermore, because endpoint device 410b continuously monitors the strength of the connection between itself and the audio device, endpoint device 410b may send a plurality of messages 440 to server 405, each indicating the strength of the connection between endpoint device 410b and the audio device at different times. Similarly, endpoint device 410a sends message 445 to server 405. Message 445 indicates to server 405 the current strength of the short-range wireless communication connection between endpoint device 410a and the audio device. Furthermore, because endpoint device 410a continuously monitors the strength of the connection between itself and the audio device, endpoint device 410a may send a plurality of messages 445 to server 405, each indicating the strength of the connection between endpoint device 410a and the audio device at different times. Messages 440 and 445 may include identifiers, such as Bluetooth addresses, for the audio device so that server 405 can appropriately compare the signal strengths between endpoint devices connected to the same audio device.

Based upon the content of messages 440 and 445, server 405 determines in operation 450 that the short-range wireless communication connection between endpoint device 410b and the audio device is stronger than the short-range wireless communication connection between endpoint device 410a and the audio device. Accordingly, server 405 provides the one or more media streams to endpoint device 410b in operation 455. Operation 455 may also include the obtaining of multimedia streams from endpoint device 410b by server 405.

As discussed above, the indication to server 405 that the strength of the short-range wireless communication connection between endpoint device 410b and the audio device is greater than that of the short-range wireless communication connection between endpoint device 410a and the audio device is in response to a plurality of messages, mainly messages 440 and 445. Accordingly, the indication recited in operation 215 of FIG. 2 may be embodied as a plurality of messages sent from endpoint device 410a and endpoint device 410b.

Figure 5:
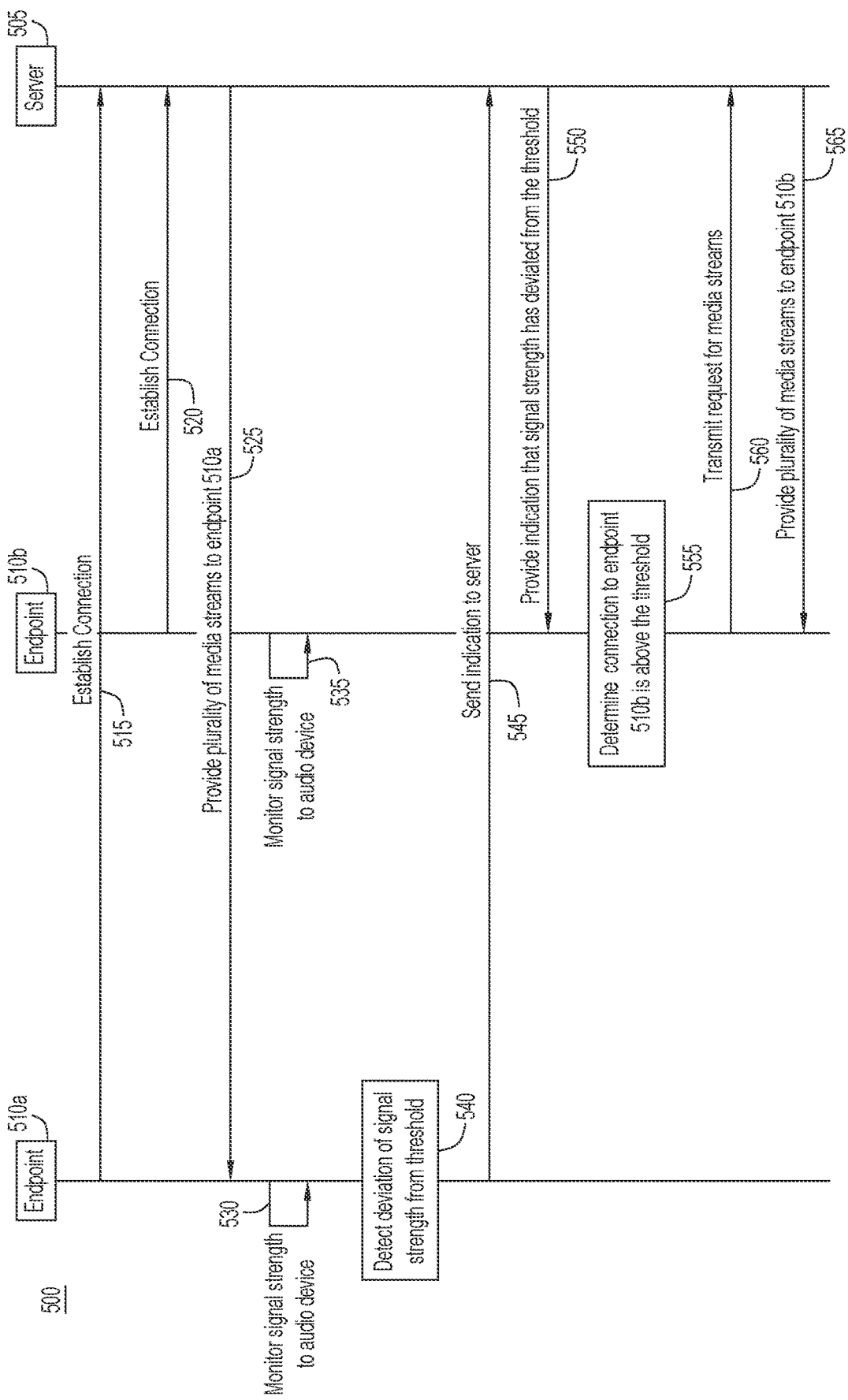
FIG. 5 is a third call flow diagram illustrating a sequence of messages and operations carried out in an online collaborative session system to handover multimedia streams from a first endpoint device to a second endpoint device based upon their respective signal strengths to a wireless device, according to an example embodiment.

With reference now made to FIG. 5, depicted therein is a third call flow diagram 500 illustrating another embodiment of the techniques of the present disclosure. As with endpoint devices 310a and 310b and server 305 of FIG. 3, endpoint device 510a may be embodied as a fixed endpoint device, endpoint device 510b may be embodied as a mobile endpoint device, and server 505 may be embodied as a meeting server of an online collaborative session system, analogous to devices 110a, 110b and 105, respectively, of FIGS. 1A-1C.

Call flow diagram 500 illustrates a third example of operation 215 of FIG. 2—i.e., the operation of obtaining at the meeting server an indication that the strength of the first short-range wireless communication connection between the audio device and the first endpoint device is less than the strength of the second short-range wireless communication connection between the audio device and the second endpoint device associated with the user. As explained in detail below, operations 540-560 provide a third example embodiment of operation 215 of FIG. 2.

Call flow diagram 500 begins with operations 515, 520 and 525, which are analogous to operations 515, 520 and 525 of FIG. 5. In operation 515, a connection is established between endpoint device 510a and server 505. In operation 520, a connection is established between endpoint device 510b and server 505. The establishment of the connections indicated in operations 515 and 520 may include providing server 505 with indications that endpoint device 510a and endpoint device 510b have both connected to the same audio device via respective short-range wireless communication connections. In operation 525, server 505 provides one or more media streams to endpoint device 510a. Accordingly, operation 525 may be embodied as server 105 of FIGS. 1A and 1B providing media streams 165a-c to endpoint device 110a. Operation 525 may also include the obtaining of multimedia streams from endpoint device 510a by server 505.

Also similar to the operations illustrated in FIG. 3, in operation 530, endpoint device 510a monitors the signal strength of the short-range wireless communication connection between itself and the audio device. Similarly, in operation 535, endpoint device 510b monitors the signal strength of the short-range wireless communication connection between itself and the audio device. It is in operation 540 that call flow diagram 500 diverges from that of call flow diagram 300 of FIG. 3, as well as from call flow diagram 400 of FIG. 4.

In operation 540, endpoint device 510a determines that the signal strength of the short-range wireless communication connection between itself and the audio device deviates from a predetermined threshold. In response to this determination, endpoint device 510a sends message 545 to server 505 which indicates the deviation of the short-range wireless communication connection strength from the threshold. Message 545 may also be embodied as a request from endpoint device 510a to provide the multimedia streams to another device associated with the user. In response to receiving message 545, server 505 sends message 550 to the other endpoint devices associated with the user, which indicates the deviation from the threshold of the short-range wireless communication connection strength between endpoint device 510a and the audio device. According to the example of FIG. 5, the only other endpoint device associated with the user is endpoint device 510b. In operation 555, endpoint device 510b determines that the signal strength of its short-range wireless communication connection does not deviate from the threshold. Therefore, in response to the determination of operation 555, endpoint device 510b sends message 560 to server 505 requesting the media streams for the online collaborative session associated with the user. Accordingly, server 505 provides the media streams to endpoint device 510b in operation 565. Operation 565 may also include the obtaining of multimedia streams from endpoint device 510b by server 505.

Messages 545 and 550 may include identifiers, such as Bluetooth addresses, for the audio device so that endpoint device 510b can appropriately compare the signal strengths between endpoint devices connected to the same audio device.

As discussed above, the indication to server 505 that the strength of the short-range wireless communication connection between endpoint device 510b and the audio device is greater than that of the short-range wireless communication connection between endpoint device 510a and the audio device is in response to a plurality of messages, mainly messages 545 and 560. Accordingly, the indication recited in operation 215 of FIG. 2 may be embodied as a plurality of messages sent from endpoint device 510a and endpoint device 510b.

Figure 6:
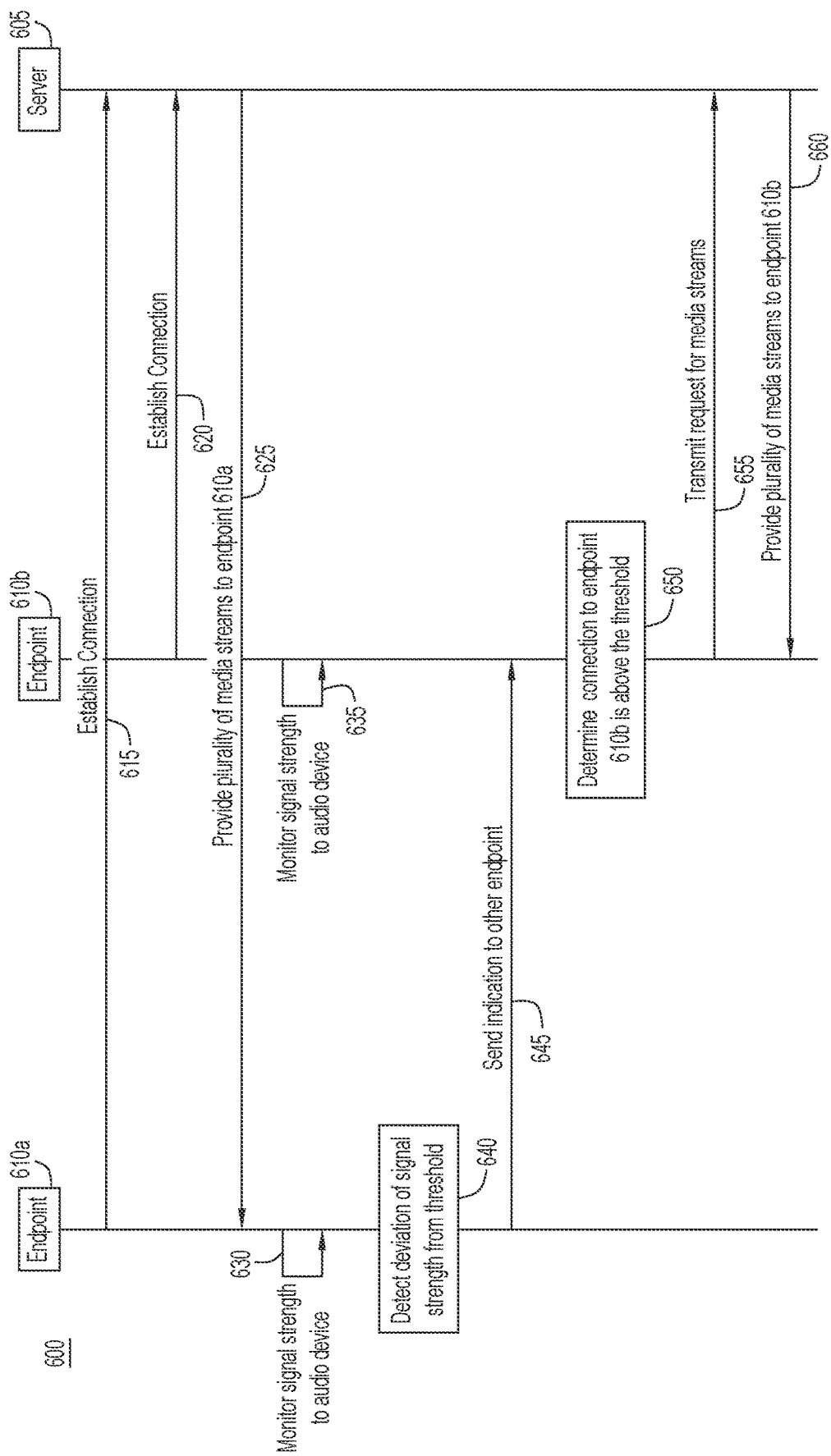
FIG. 6 is a fourth call flow diagram illustrating a sequence of messages and operations carried out in an online collaborative session system to handover multimedia streams from a first endpoint device to a second endpoint device based upon their respective signal strengths to a wireless device, according to an example embodiment.

With reference now made to FIG. 6, depicted therein is a fourth call flow diagram 600 illustrating another embodiment of the techniques of the present disclosure. Call flow diagram 600 is analogous to call flow diagram 500 of FIG. 5 though operation 640, with operations 615, 620, 625, 630, 635 and 640 corresponding to operations 515, 520, 525, 530, 535 and 540 of FIG. 5, respectively. Accordingly, the description of call flow diagram 600 through operation 640 is omitted. Call flow diagram 600 diverges from call flow diagram 500 with message 645. Message 645 is an indication that the signal strength of the short-range wireless communication connection between endpoint device 610a and the audio device has deviated from the threshold. Unlike message 545 of FIG. 5, message 645 is sent to endpoint device 610b instead of server 605. Message 645 may include an identifier, such as a Bluetooth address, for the audio device so that endpoint device 610b can appropriately compare the signal strengths between endpoint devices connected to the same audio device.

In response to receiving message 645, endpoint device 610b determines in operation 650 that its short-range wireless communication connection to the audio device is above the threshold. Accordingly, endpoint device 610b sends request message 655 to server 605 requesting the media streams for the online collaborative session associated with the user. Server 605 responds by providing the media streams to endpoint device 610b in operation 660. Operation 660 may also include the obtaining of multimedia streams from endpoint device 610b by server 605.

As discussed above, the indication to server 605 that the strength of the short-range wireless communication connection between endpoint device 610b and the audio device is greater than that of the short-range wireless communication connection between endpoint device 610a and the audio device is in response to message 655. Accordingly, the indication recited in operation 215 of FIG. 2 may be embodied as a message sent from endpoint device 610b.

The examples described above with respect to FIGS. 5 and 6 may be beneficial in that it is endpoint device 510b or 610b, respectively, which requests that the multimedia streams associated with the online collaborative session be provided to it. This allows endpoint devices 510a and 610a, as well as servers 505 and 605, respectively, to operate the same regardless of whether or not there are other endpoint devices connected to the same audio device as endpoint devices 510a and 610a. Specifically, servers 505 and 605 will only hand over the multimedia streams in response to a specific request, embodied as messages 560 and 655 in FIGS. 5 and 6, respectively. If there are no other devices connected to the same audio device as endpoint devices 510a and 610a, the request messages 560 and 655 will not be sent and no hand over will ever take place. In other words, if messages 550 and 645 are not received by endpoint devices associated with the same audio device as endpoint devices 510a and 610a, there will be no responses to these messages requesting hand over of the multimedia streams associated with the online collaborative session.

Figure 7:
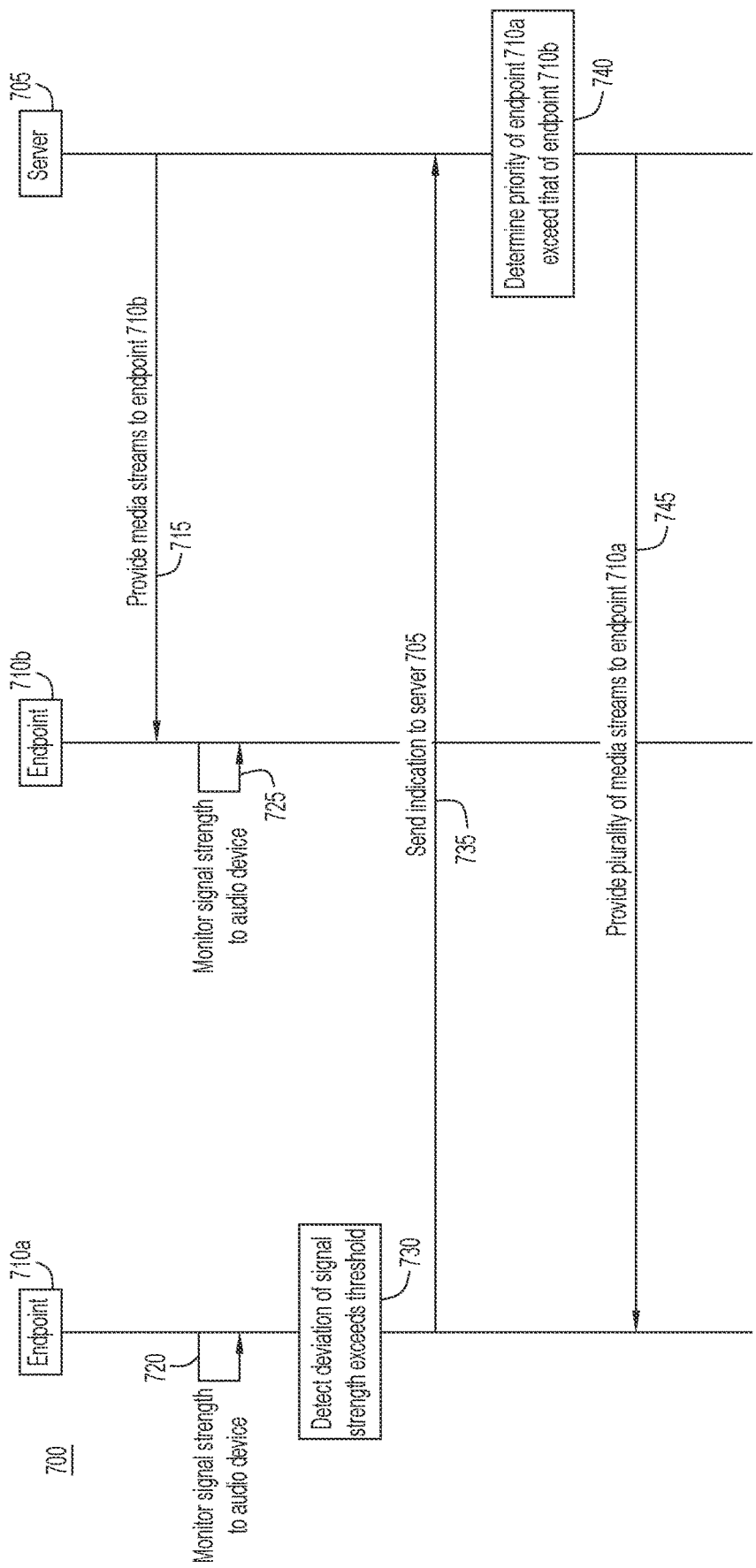
FIG. 7 is a first call flow diagram illustrating a sequence of messages and operations carried out in an online collaborative session system to handback multimedia streams to a first endpoint device from a second endpoint device based upon their respective signal strengths to a wireless device, according to an example embodiment.
Figure 8:
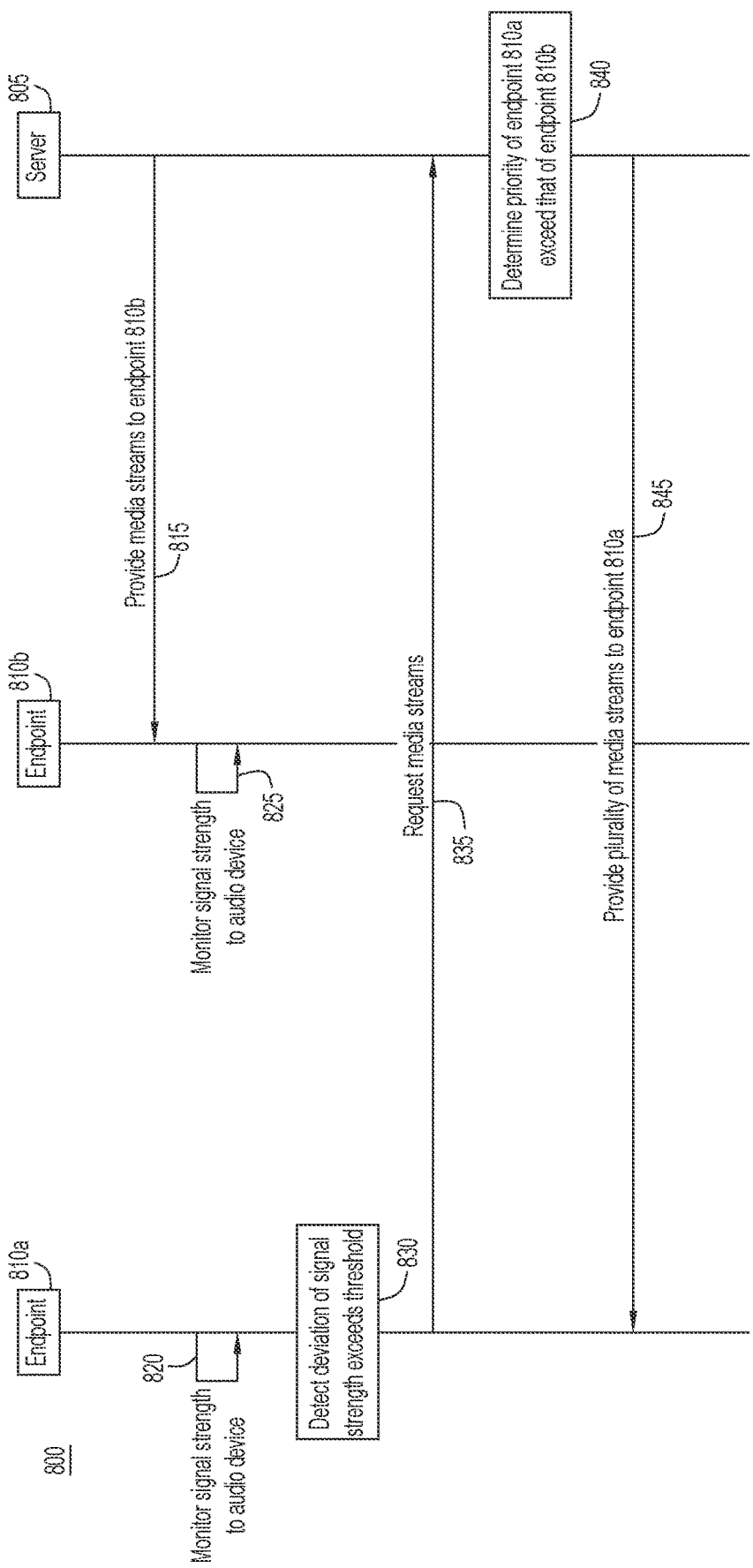
FIG. 8 is a second call flow diagram illustrating a sequence of messages and operations carried out in an online collaborative session system to handback multimedia streams to a first endpoint device from a second endpoint device based upon their respective signal strengths to a wireless device, according to an example embodiment.
Figure 9:
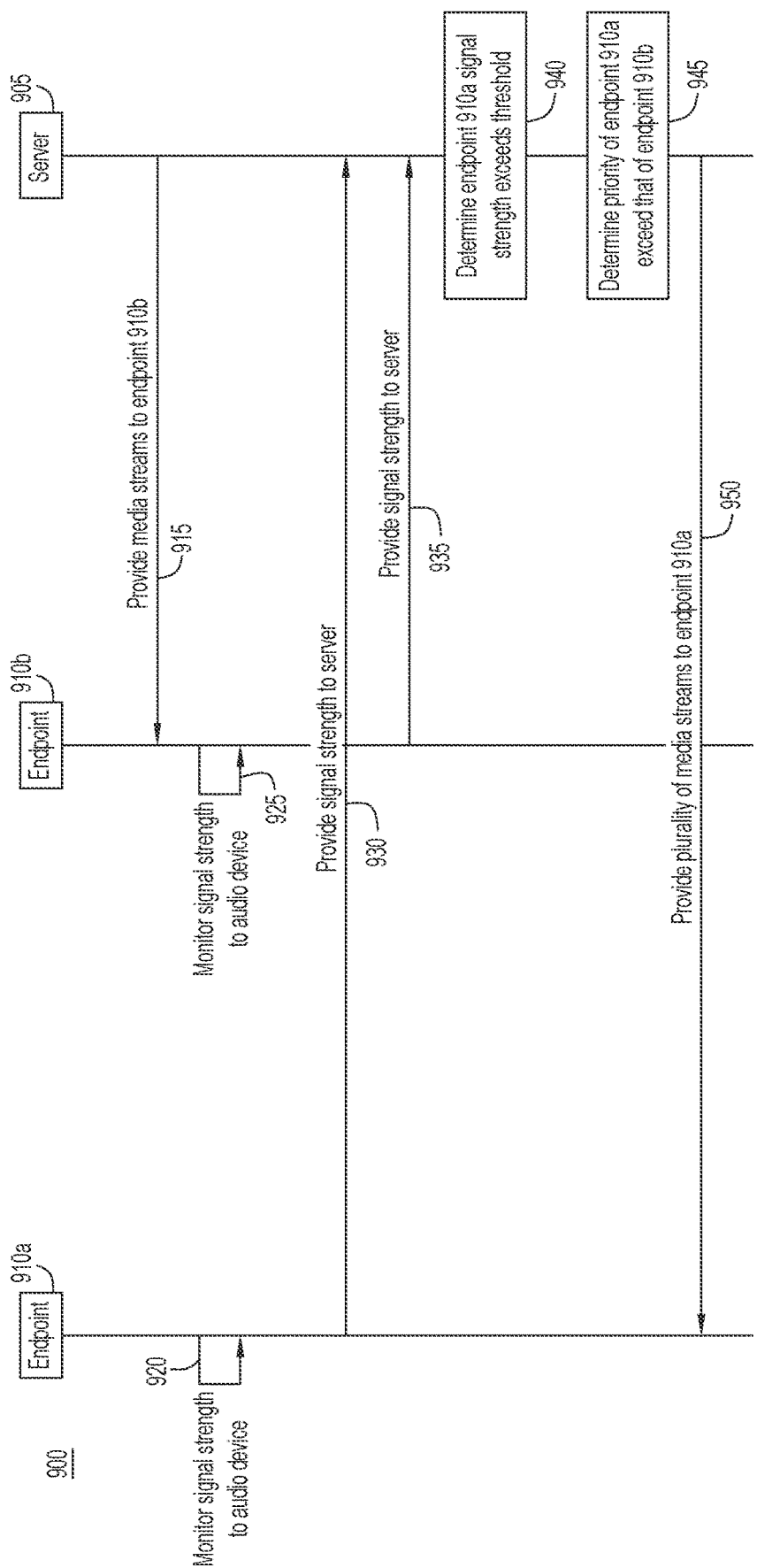
FIG. 9 is a third call flow diagram illustrating a sequence of messages and operations carried out in an online collaborative session system to handback multimedia streams to a first endpoint device from a second endpoint device based upon their respective signal strengths to a wireless device, according to an example embodiment.

The techniques of the present disclosure also provide for the handing back of the multimedia streams of an online collaborative session to the previous endpoint device when the signal strength of a short-range wireless communication connection becomes sufficiently strong. Using the example discussed above of the user who leaves his or her workstation to get a cup of coffee, the techniques of the present disclosure allow for the handing back of the online collaborative session to the workstation when the user returns to it. FIGS. 7-9 provide example call flows for implementing such a handing back.

With reference now made to FIG. 7, depicted therein is a call flow diagram 700 illustrating a first process by which an online collaborative session is handed back to a device having higher priority than the endpoint device currently receiving the multimedia streams associated with the online collaborative session. Specifically, call flow diagram 700 illustrates a process by which a mobile endpoint device may handback an online collaborative session stream to a fixed endpoint device when a short-range wireless communication connection between an audio device and the fixed endpoint device becomes sufficiently strong. Endpoint device 710a, endpoint device 710b and server 705 are analogous to the devices 110a, 110b and 105, respectively, as illustrated in FIGS. 1A-1C. Accordingly, endpoint device 710a may be embodied as a fixed endpoint device, endpoint device 710b may be embodied as a mobile endpoint device, and server 705 may be embodied as a meeting server of an online collaborative session system.

Call flow diagram 700 begin in operation 715 where server 705 is providing the multimedia streams for an online collaborative session to mobile endpoint device 710b. Operation 715 may also include server 705 obtaining multimedia streams for the online collaborative session from mobile endpoint device 710b. In other words, call flow diagram 700 may be a continuation of any one of the call flows described with reference to FIGS. 3-6, above.

In operation 720, endpoint device 710a monitors the signal strength of the short-range wireless communication connection between itself and the audio device. Similarly, in operation 725, endpoint device 710b monitors the signal strength of the short-range wireless communication connection between itself and the audio device. In operation 730, endpoint device 710a determines that the signal strength between itself and the audio device has exceeded a predetermined threshold. This threshold may be significantly higher than the threshold described above with reference to operation 540 of FIG. 5 or operation 640 of FIG. 6. This is because certain embodiments of the techniques of the present disclosure may be configured to avoid a state where the multimedia streams are constantly switching between endpoint device 710a and 710b. For example, if the threshold at which the online collaborative session is handed over to the mobile endpoint device is sufficiently close to the threshold at which the online collaborative session is handed back to the fixed endpoint device, the user may find themselves positioned where small movements cause a hand over between its two endpoint devices. In other words, a "race" condition may be established if the threshold value for handover to the mobile endpoint device is sufficiently close to the threshold for handing back to the fixed endpoint device. Such a condition may be avoided if the handback threshold of operation 730 is sufficiently larger than the handover threshold of operation 540 of FIG. 5 or operation 640 of FIG. 6. The thresholds described below with reference to FIGS. 8 and 9 may be similarly configured as the threshold discussed here with reference to FIG. 7.

In response to the determination of operation 730, endpoint device 710a sends message 735 to server 705, which indicates to server 705 that the connection strength between endpoint device 710*a* and the audio device has exceeded the predetermined threshold. Upon receipt of message 735, server 705 determines in operation 740 if a priority associated with endpoint device 710*a* exceeds that of endpoint device 710*b*. If the priority for endpoint device 710*a* does, in fact, exceed that of endpoint device 710*b*, then server 705 provides the multimedia streams associated with the online collaborative session to endpoint device 710*a* in operation 745. Operation 745 may also include server 705 obtaining multimedia streams for the online collaborative session from endpoint device 710*a*. On the other hand, if the priority for endpoint device 710*a* does not exceed that of endpoint device 710*b*, server 705 may continue to provide/obtain the multimedia streams to/from endpoint device 710*b*.

With reference now made to FIG. 8, depicted therein is a call flow diagram 800 illustrating a second process by which an online collaborative session is handed back to a device having higher priority than the endpoint device currently receiving the multimedia streams. Call flow diagram 800 begins in the same way as call flow diagram 700 of FIG. 7, with operation 815 corresponding to operation 715 of FIG. 7, operation 820 corresponding to operation 720 of FIG. 7, and operation 825 corresponding to operation 725 of FIG. 7. Call flow diagram 800 diverges from call flow diagram 700 of FIG. 7 after it is determined in operation 830 that the signal strength of the short-range wireless communication connection between endpoint device 810*a* and the audio device exceeds a predetermined threshold. Instead of providing server 805 with an indication of the signal strength, endpoint device 810*a* requests the multimedia streams associated with the online collaborative session via message 835.

Upon receipt of message 835, server 805 determines in operation 840 if a priority associated with endpoint device 810*a* exceeds that of endpoint device 710*b*. If the priority for endpoint device 810*a* does, in fact, exceed that of endpoint device 810*b*, then server 805 provides the multimedia streams associated with the online collaborative session to endpoint device 810*a* in operation 845. Operation 845 may also include server 805 obtaining multimedia streams for the online collaborative session from endpoint device 810*a*. On the other hand, if the priority for endpoint device 810*a* does not exceed that of endpoint device 810*b*, server 805 may continue to provide/obtain the multimedia streams to/from endpoint device 810*b*.

With reference now made to FIG. 9, depicted therein is a call flow diagram 900 illustrating a third process by which an online collaborative session is handed back to a device having higher priority than the endpoint device currently receiving the multimedia streams. As with call flow diagram 800 of FIG. 8, call flow diagram 900 begins in the same way as call flow diagram 700 of FIG. 7, with operation 915 corresponding to operation 715 of FIG. 7, operation 920 corresponding to operation 720 of FIG. 7, and operation 925 corresponding to operation 725 of FIG. 7. Call flow diagram 900 diverges from call flow diagram 700 of FIG. 7 with messages 930 and 935. Through messages 930 and 935, endpoint devices 910*a* and 910*b* provide indications of their respective short-range wireless communication connection signal strengths to server 905.

Based upon the indications provided in messages 930, server 905 determines in operation 940 if the signal strength of the short-range wireless communication connection between endpoint device 910*a* and the audio device exceeds a predetermined threshold. If the signal strength does exceed the threshold, server 905 then determines in operation 945 whether or not the priority of endpoint device 910*a* exceeds the priority of the endpoint device currently receiving the multimedia streams for the user, which is endpoint device 910*b* (as illustrated through operation 915). If the priority for endpoint device 910*a* does, in fact, exceed that of endpoint device 910*b*, then server 905 provides the multimedia streams associated with the online collaborative session to endpoint device 910*a* in operation 950. Operation 950 may also include server 905 obtaining multimedia streams for the online collaborative session from endpoint device 910*a*. On the other hand, if the priority for endpoint device 910*a* does not exceed that of endpoint device 910*b*, server 905 may continue to provide/obtain the multimedia streams to/from endpoint device 810*b*.

Figure 10:
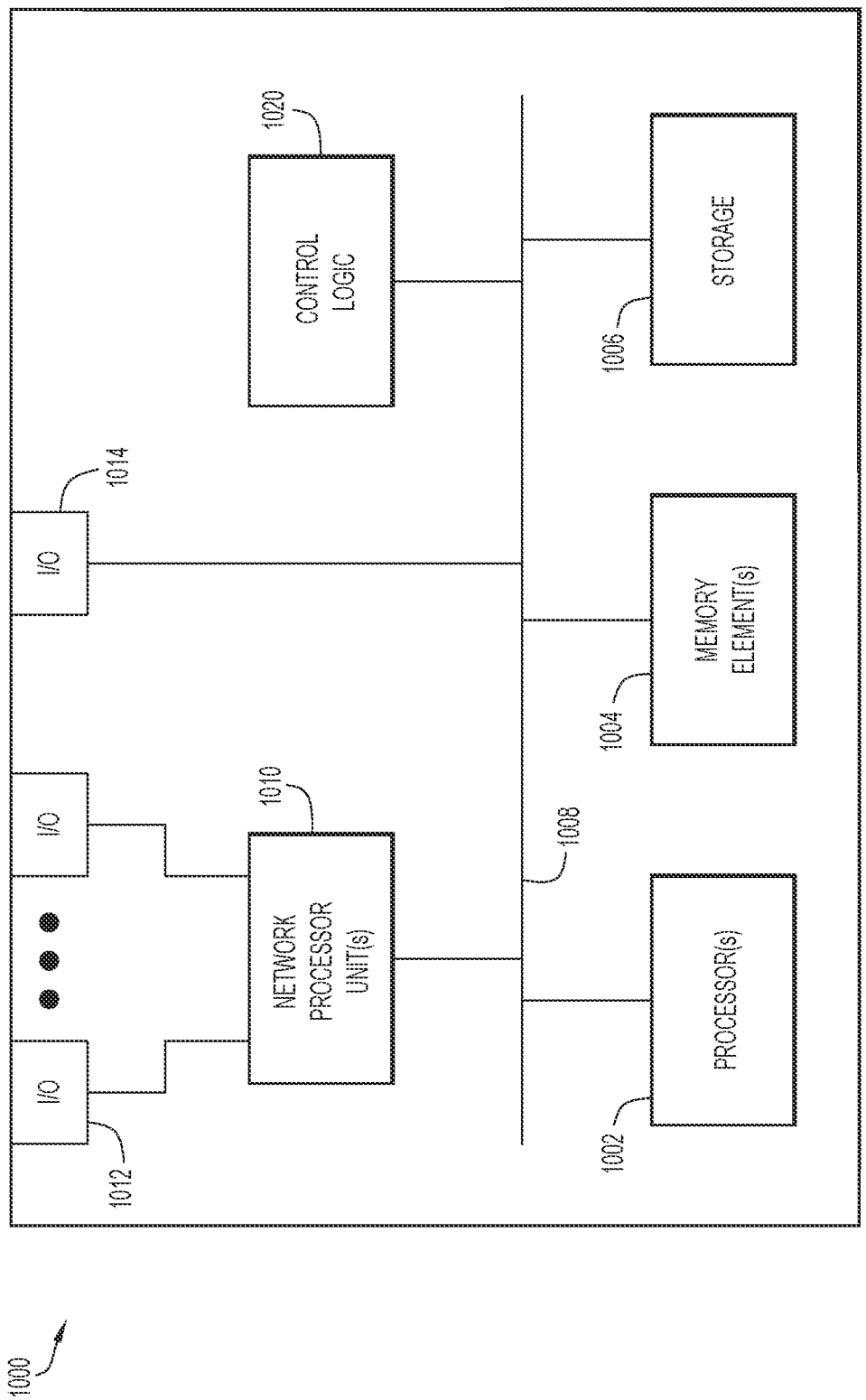
FIG. 10 is a functional block diagram of a computing device configured to implement the media stream handover techniques of the present disclosure, according to an example embodiment.

Referring to FIG. 10, FIG. 10 illustrates a hardware block diagram of a computing device 1000 that may perform functions associated with operations discussed herein in connection with the techniques depicted in FIGS. 1A-1C and 2-9. In various embodiments, a computing device or apparatus, such as computing device 1000 or any combination of computing devices 1000, may be configured as any entity/entities as discussed for the techniques depicted in connection with FIGS. 1A-1C and 2-9 in order to perform operations of the various techniques discussed herein.

In at least one embodiment, the computing device 1000 may be any apparatus that may include one or more processor(s) 1002, one or more memory element(s) 1004, storage 1006, a bus 1008, one or more network processor unit(s) 1010 interconnected with one or more network input/output (I/O) interface(s) 1012, one or more I/O interface(s) 1014, and control logic 1020. In various embodiments, instructions associated with logic for computing device 1000 can overlap in any manner and are not limited to the specific allocation of instructions and/or operations described herein.

In at least one embodiment, processor(s) 1002 is/are at least one hardware processor configured to execute various tasks, operations and/or functions for computing device 1000 as described herein according to software and/or instructions configured for computing device 1000. Processor(s) 1002 (e.g., a hardware processor) can execute any type of instructions associated with data to achieve the operations detailed herein. In one example, processor(s) 1002 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1004 and/or storage 1006 is/are configured to store data, information, software, and/or instructions associated with computing device 1000, and/or logic configured for memory element(s) 1004 and/or storage 1006. For example, any logic described herein (e.g., control logic 1020) can, in various embodiments, be stored for computing device 1000 using any combination of memory element(s) 1004 and/or storage 1006. Note that in some embodiments, storage 1006 can be consolidated with memory element(s) 1004 (or vice versa), or can overlap/exist in any other suitable manner.

In at least one embodiment, bus 1008 can be configured as an interface that enables one or more elements of computing device 1000 to communicate in order to exchange information and/or data. Bus 1008 can be implemented with any architecture designed for passing control, data and/or information between processors, memory elements/storage, peripheral devices, and/or any other hardware and/or software components that may be configured for computing device 1000. In at least one embodiment, bus 1008 may be implemented as a fast kernel-hosted interconnect, potentially using shared memory between processes (e.g., logic), which can enable efficient communication paths between the processes.

In various embodiments, network processor unit(s) 1010 may enable communication between computing device 1000 and other systems, entities, etc., via network I/O interface(s) 1012 (wired and/or wireless) to facilitate operations discussed for various embodiments described herein. In various embodiments, network processor unit(s) 1010 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 1000 and other systems, entities, etc. to facilitate operations for various embodiments described herein. In various embodiments, network I/O interface(s) 1012 can be configured as one or more Ethernet port(s), Fibre Channel ports, any other I/O port(s), and/or antenna(s)/antenna array(s) now known or hereafter developed. Thus, the network processor unit(s) 1010 and/or network I/O interface(s) 1012 may include suitable interfaces for receiving, transmitting, and/or otherwise communicating data and/or information in a network environment.

I/O interface(s) 1014 allow for input and output of data and/or information with other entities that may be connected to computer device 1000. For example, I/O interface(s) 1014 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1020 can include instructions that, when executed, cause processor(s) 1002 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1020) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 1004 and/or storage 1006 can store data, software, code, instructions (e.g., processor instructions), logic, parameters, combinations thereof, and/or the like used for operations described herein. This includes memory element(s) 1004 and/or storage 1006 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi/Wi-Fi6), IEEE 802.16 (e.g., Worldwide Interoperability for Microwave Access (WiMAX)), Radio-Frequency Identification (RFID), NFC, Bluetooth™, mm.wave, UWB, etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of,' one or more of, 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

In summary, provided for herein are techniques that tie the ability to connect headsets wirelessly to multiple devices with the radio signal strength to make smart and real time decisions to ensure that a video conference user's audio connection is not disturbed even when they are moving about.

In some aspects, the techniques described herein relate to a method including: establishing a first connection between a meeting server and a first endpoint device associated with a user; providing at least one multimedia stream for an online collaborative session from the meeting server to the first endpoint device; obtaining, at the meeting server, an indication that a first strength of a first short-range wireless communication connection between an audio device and the first endpoint device is less than a second strength of a second short-range wireless communication connection between the audio device and a second endpoint device associated with the user; establishing a second connection between the meeting server and the second endpoint device; and providing the at least one multimedia stream from the meeting server to the second endpoint device via the second connection in response to obtaining the indication.

In some aspects, the techniques described herein relate to a method, wherein obtaining the indication includes obtaining a request from the second endpoint device to provide the at least one multimedia stream to the second endpoint device via the second connection.

In some aspects, the techniques described herein relate to a method, wherein obtaining the indication includes: obtaining, at the meeting server, an indication of the first strength; obtaining, at the meeting server, an indication of the second strength; and determining from the indication of the first strength and the indication of the second strength that the first strength is less than the second strength.

In some aspects, the techniques described herein relate to a method, wherein obtaining the indication includes: obtaining, at the meeting server, an indication from the first endpoint device that the first strength has deviated from a threshold; providing, from the meeting server to the second endpoint device, the indication that the first strength has deviated from the threshold; and obtaining, at the meeting server, a request from the second endpoint device to provide the at least one multimedia stream from meeting server to the second endpoint device via the second connection.

In some aspects, the techniques described herein relate to a method, wherein obtaining the indication includes: obtaining, at the meeting server, an indication from the first endpoint device that the first strength has deviated from a threshold; providing, from the meeting server to the second endpoint device, the indication that the first strength has deviated from the threshold; obtaining, at the meeting server, an indication of the second strength from the second endpoint device; and determining that the first strength is less than the second strength in response to receiving the indication of the second strength.

In some aspects, the techniques described herein relate to a method, wherein the at least one multimedia stream includes an audio stream or a video stream.

In some aspects, the techniques described herein relate to a method, wherein the first short-range wireless communication connection includes a first Bluetooth connection and the second short-range wireless communication connection includes a second Bluetooth connection.

In some aspects, the techniques described herein relate to a method, wherein the audio device includes a personal speaker.

In some aspects, the techniques described herein relate to a method, wherein the first endpoint device includes a desktop or laptop computing device and second endpoint device include a smartphone or tablet computing device.

In some aspects, the techniques described herein relate to an apparatus including: one or more network interfaces; and one or more processors configured to perform operations on behalf of a meeting server, the operations including: establishing, via the one or more network interfaces, a first connection between the meeting server and a first endpoint device associated with a user; providing, via the one or more network interfaces, at least one multimedia stream for an online collaborative session from the meeting server to the first endpoint device; obtaining, at the meeting server via the one or more network interfaces, an indication that a first strength of a first short-range wireless communication connection between an audio device and the first endpoint device is less than a second strength of a second short-range wireless communication connection between the audio device and a second endpoint device associated with the user; establishing, via the one or more network interfaces, a second connection between the meeting server and the second endpoint device; and providing, via the one or more network interfaces, the at least one multimedia stream from the meeting server to the second endpoint device via the second connection in response to obtaining the indication.

In some aspects, the techniques described herein relate to an apparatus, wherein the one or more processors are configured to obtain the indication by obtaining a request from the second endpoint device to provide the at least one multimedia stream to the second endpoint device via the second connection.

In some aspects, the techniques described herein relate to an apparatus, wherein the one or more processors are configured to obtain the indication by: obtaining, at the meeting server via the one or more network interfaces, an indication of the first strength; obtaining, at the meeting server via the one or more network interfaces, an indication of the second strength; and determining from the indication of the first strength and the indication of the second strength that the first strength is less than the second strength.

In some aspects, the techniques described herein relate to an apparatus, wherein the one or more processors are configured to obtain the indication by: obtaining, at the meeting server via the one or more network interfaces, an indication from the first endpoint device that the first strength has deviated from a threshold; providing, from the meeting server to the second endpoint device via the one or more network interfaces, the indication that the first strength has deviated from the threshold; and obtaining, at the meeting server via the one or more network interfaces, a request from the second endpoint device to provide the at least one multimedia stream from meeting server to the second endpoint device via the second connection.

In some aspects, the techniques described herein relate to an apparatus, wherein the one or more processors are configured to obtain the indication by: obtaining, at the meeting server via the one or more network interfaces, an indication from the first endpoint device that the first strength has deviated from a threshold; providing, from the meeting server to the second endpoint device via the one or more network interfaces, the indication that the first strength has deviated from the threshold; obtaining, at the meeting server via the one or more network interfaces, an indication of the second strength from the second endpoint device; and determining that the first strength is less than the second strength in response to receiving the indication of the second strength.

In some aspects, the techniques described herein relate to an apparatus, wherein the first short-range wireless communication connection includes a first Bluetooth connection and the second short-range wireless communication connection includes a second Bluetooth connection.

In some aspects, the techniques described herein relate to one or more tangible non-transitory computer readable mediums encoded with instructions, wherein the instructions, when executed by one or more processors, are operable to perform operations including: establishing a first connection between a meeting server and a first endpoint device associated with a user; providing at least one multimedia stream for an online collaborative session from the meeting server to the first endpoint device; obtaining, at the meeting server, an indication that a first strength of a first short-range wireless communication connection between an audio device and the first endpoint device is less than a second strength of a second short-range wireless communication connection between the audio device and a second endpoint device associated with the user; establishing a second connection between the meeting server and the second endpoint device; and providing the at least one multimedia stream from the meeting server to the second endpoint device via the second connection in response to obtaining the indication.

In some aspects, the techniques described herein relate to one or more tangible non-transitory computer readable mediums, wherein the instructions operable to obtain the indication are further operable to obtain a request from the second endpoint device to provide the at least one multimedia stream to the second endpoint device via the second connection.

In some aspects, the techniques described herein relate to one or more tangible non-transitory computer readable mediums, wherein the instructions operable to obtain the indication are further operable to: obtain, at the meeting server, an indication of the first strength; obtain, at the meeting server, an indication of the second strength; and determine from the indication of the first strength and the indication of the second strength that the first strength is less than the second strength.

In some aspects, the techniques described herein relate to one or more tangible non-transitory computer readable mediums, wherein the instructions operable to obtain the indication are further operable to: obtain, at the meeting server, an indication from the first endpoint device that the first strength has deviated from a threshold; provide, from the meeting server to the second endpoint device, the indication that the first strength has deviated from the threshold; and obtain, at the meeting server, a request from the second endpoint device to provide the at least one multimedia stream from meeting server to the second endpoint device via the second connection.

In some aspects, the techniques described herein relate to one or more tangible non-transitory computer readable mediums, wherein the instructions operable to obtain the indication are further operable to: obtain, at the meeting server, an indication from the first endpoint device that the first strength has deviated from a threshold; provide, from the meeting server to the second endpoint device, the indication that the first strength has deviated from the threshold; obtain, at the meeting server, an indication of the second strength from the second endpoint device; and determine that the first strength is less than the second strength in response to receiving the indication of the second strength.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
    establishing a first connection between a meeting server and a first endpoint device associated with a user;
    providing at least one multimedia stream for an online collaborative session from the meeting server to the first endpoint device;
    obtaining, at the meeting server, an indication that a first strength of a first short-range wireless communication connection between an audio device and the first endpoint device is less than a second strength of a second short-range wireless communication connection between the audio device and a second endpoint device associated with the user;
    determining, at the meeting server based on the indication that the first strength is less than the second strength, that the at least one multimedia stream should be provided to the second endpoint device;
    establishing a second connection between the meeting server and the second endpoint device; and
    providing the at least one multimedia stream from the meeting server to the second endpoint device via the second connection in response to obtaining the indication.

2. The method of claim 1, wherein obtaining the indication comprises:
    obtaining, at the meeting server, an indication of the first strength;
    obtaining, at the meeting server, an indication of the second strength; and
    determining from the indication of the first strength and the indication of the second strength that the first strength is less than the second strength.

3. The method of claim 1, wherein obtaining the indication comprises:
    obtaining, at the meeting server, an indication from the first endpoint device that the first strength has deviated from a threshold;
    providing, from the meeting server to the second endpoint device, the indication that the first strength has deviated from the threshold; and
    obtaining, at the meeting server, a request from the second endpoint device to provide the at least one multimedia stream from meeting server to the second endpoint device via the second connection.

4. The method of claim 1, wherein obtaining the indication comprises:
    obtaining, at the meeting server, an indication from the first endpoint device that the first strength has deviated from a threshold;
    providing, from the meeting server to the second endpoint device, the indication that the first strength has deviated from the threshold;
    obtaining, at the meeting server, an indication of the second strength from the second endpoint device; and
    determining that the first strength is less than the second strength in response to receiving the indication of the second strength.

5. The method of claim 1, wherein the at least one multimedia stream comprises an audio stream or a video stream.

6. The method of claim 1, wherein the first short-range wireless communication connection comprises a first Bluetooth connection and the second short-range wireless communication connection comprises a second Bluetooth connection.

7. The method of claim 1, wherein the audio device comprises a personal speaker.

8. The method of claim 1, wherein the first endpoint device comprises a desktop or laptop computing device and second endpoint device comprise a smartphone or tablet computing device.

9. An apparatus comprising:
    one or more network interfaces; and
    one or more processors configured to perform operations on behalf of a meeting server, the operations including:

establishing, via the one or more network interfaces, a first connection between the meeting server and a first endpoint device associated with a user;

providing, via the one or more network interfaces, at least one multimedia stream for an online collaborative session from the meeting server to the first endpoint device;

obtaining, at the meeting server via the one or more network interfaces, an indication that a first strength of a first short-range wireless communication connection between an audio device and the first endpoint device is less than a second strength of a second short-range wireless communication connection between the audio device and a second endpoint device associated with the user;

determining, at the meeting server based on the indication that the first strength is less than the second strength, that the at least one multimedia stream should be provided to the second endpoint device;

establishing, via the one or more network interfaces, a second connection between the meeting server and the second endpoint device; and providing, via the one or more network interfaces, the at least one multimedia stream from the meeting server to the second endpoint device via the second connection in response to obtaining the indication.

10. The apparatus of claim 9, wherein the one or more processors are configured to obtain the indication by:

obtaining, at the meeting server via the one or more network interfaces, an indication of the first strength;

obtaining, at the meeting server via the one or more network interfaces, an indication of the second strength; and determining from the indication of the first strength and the indication of the second strength that the first strength is less than the second strength.

11. The apparatus of claim 9, wherein the one or more processors are configured to obtain the indication by:

obtaining, at the meeting server via the one or more network interfaces, an indication from the first endpoint device that the first strength has deviated from a threshold;

providing, from the meeting server to the second endpoint device via the one or more network interfaces, the indication that the first strength has deviated from the threshold; and obtaining, at the meeting server via the one or more network interfaces, a request from the second endpoint device to provide the at least one multimedia stream from meeting server to the second endpoint device via the second connection.

12. The apparatus of claim 9, wherein the one or more processors are configured to obtain the indication by:

obtaining, at the meeting server via the one or more network interfaces, an indication from the first endpoint device that the first strength has deviated from a threshold;

providing, from the meeting server to the second endpoint device via the one or more network interfaces, the indication that the first strength has deviated from the threshold;

obtaining, at the meeting server via the one or more network interfaces, an indication of the second strength from the second endpoint device; and determining that the first strength is less than the second strength in response to receiving the indication of the second strength.

13. The apparatus of claim 9, wherein the first short-range wireless communication connection comprises a first Bluetooth connection and the second short-range wireless communication connection comprises a second Bluetooth connection.

14. The apparatus of claim 9, wherein the audio device comprises a personal speaker.

15. One or more tangible non-transitory computer readable mediums encoded with instructions, wherein the instructions, when executed by one or more processors, are operable to perform operations including:

establishing a first connection between a meeting server and a first endpoint device associated with a user;

providing at least one multimedia stream for an online collaborative session from the meeting server to the first endpoint device;

obtaining, at the meeting server, an indication that a first strength of a first short-range wireless communication connection between an audio device and the first endpoint device is less than a second strength of a second short-range wireless communication connection between the audio device and a second endpoint device associated with the user;

determining, at the meeting server based on the indication that the first strength is less than the second strength, that the at least one multimedia stream should be provided to the second endpoint device;

establishing a second connection between the meeting server and the second endpoint device; and providing the at least one multimedia stream from the meeting server to the second endpoint device via the second connection in response to obtaining the indication.

16. The one or more tangible non-transitory computer readable mediums of claim 15, wherein the instructions operable to obtain the indication are further operable to:

obtain, at the meeting server, an indication of the first strength;

obtain, at the meeting server, an indication of the second strength; and determine from the indication of the first strength and the indication of the second strength that the first strength is less than the second strength.

17. The one or more tangible non-transitory computer readable mediums of claim 15, wherein the instructions operable to obtain the indication are further operable to:

obtain, at the meeting server, an indication from the first endpoint device that the first strength has deviated from a threshold;

provide, from the meeting server to the second endpoint device, the indication that the first strength has deviated from the threshold; and obtain, at the meeting server, a request from the second endpoint device to provide the at least one multimedia stream from meeting server to the second endpoint device via the second connection.

18. The one or more tangible non-transitory computer readable mediums of claim 15, wherein the instructions operable to obtain the indication are further operable to:

obtain, at the meeting server, an indication from the first endpoint device that the first strength has deviated from a threshold;

provide, from the meeting server to the second endpoint device, the indication that the first strength has deviated from the threshold;

obtain, at the meeting server, an indication of the second strength from the second endpoint device; and determine that the first strength is less than the second strength in response to receiving the indication of the second strength.

19. The one or more tangible non-transitory computer readable mediums of claim 15, wherein the first short-range wireless communication connection comprises a first Bluetooth connection and the second short-range wireless communication connection comprises a second Bluetooth connection.

20. The one or more tangible non-transitory computer readable mediums of claim 15, wherein the audio device comprises a personal speaker.

* * * * *